(No Model.)
J. F. BUSSELLS.
COOKING AND PRESSING APPARATUS.
No. 604,348. Patented May 17, 1898.
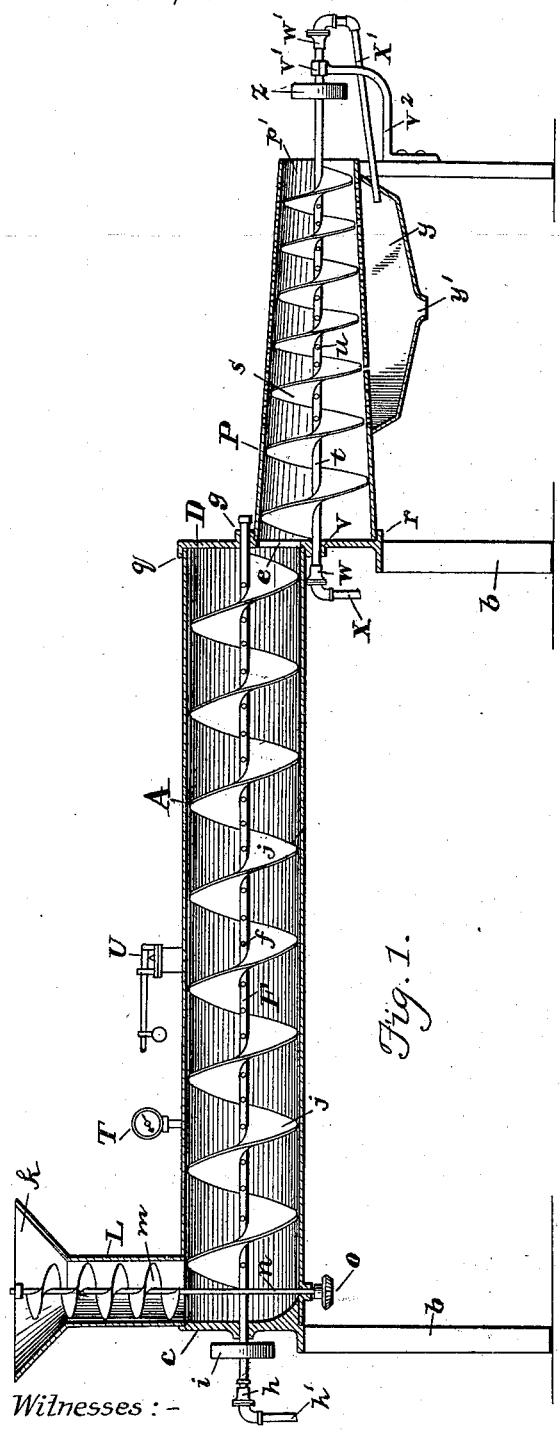
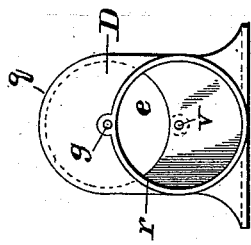
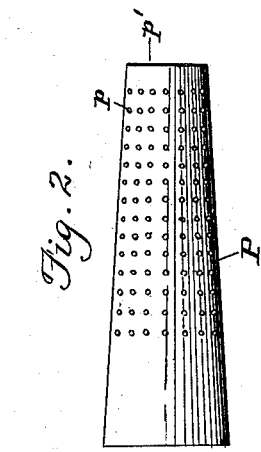
Witnesses:—
Inventor:
Josephus F. Bussells
By Chas. B. Mann
Attorney.

UNITED STATES PATENT OFFICE.

JOSEPHUS F. BUSSELLS, OF IRVINGTON, VIRGINIA.

COOKING AND PRESSING APPARATUS.

SPECIFICATION forming part of Letters Patent No. 604,348, dated May 17, 1898.

Application filed December 30, 1897. Serial No. 664,613. (No model.)

*To all whom it may concern:*

Be it known that I, JOSEPHUS F. BUSSELLS, a citizen of the United States, residing at Irvington, in the county of Lancaster and State of Virginia, have invented certain new and useful Improvements in Cooking and Pressing Apparatus, of which the following is a specification.

This invention relates to an apparatus for first cooking and then pressing the material cooked for the purpose of extracting oil.

One object of the invention is to provide an apparatus for cooking fish or other material by the direct application to the fish of steam under pressure, the apparatus to be capable of continuous operation—that is, to admit of constant cooking, charging, and discharging without intermissions.

Another object is to provide for subjecting the cooked material while hot and without exposure to the atmosphere to compression in order to separate any oil or water contained in the material.

The invention is illustrated in the accompanying drawings, in which—

Figure 1 is a vertical longitudinal section of the complete apparatus. Fig. 2 is a side view of the tapered case of the compressor. Fig. 3 is a view of the wall or plate which adjoins or separates the cooker and compressor.

The cooking-cylinder A is substantially horizontal, though it might be used on an incline. It rests on suitable supports $b$. At the feeding-in end the cylinder is closed by a head $c$ and at the discharge end by a head D, having an elliptic-shaped discharge-opening $e$, which adjoins the lower or bottom part of the cylinder. A tubular shaft or pipe F extends lengthwise through the cylinder and revolves in a hole or bearing $g$ in each head, and the ends of this shaft project on the outside of the heads. At one end the shaft is fitted to a stuffing-box $h$, to which a steam-supply pipe $h'$ is attached, and a pulley $i$ is fixed on this projecting end for a belt, by which the shaft F may be revolved. Within the cylinder the hollow shaft has small holes $f$ for steam to pass from the shaft to the cylinder, and a spiral flange or screw $j$ is fixed around the shaft and fills the cylinder and extends from one end to the other.

The feeding-in device is constructed and arranged to permit the entrance to the cylinder of a continuous supply of fish or other material to be cooked and at the same time to prevent the escape at such device of steam under pressure from the cylinder. This device comprises the feed neck or pipe L, opening into the cylinder and having a funnel or hopper mouth $k$ and a force-feed screw $m$ revoluble in said neck. In the present instance the feed-screw $m$ is fixed on a shaft $n$, which has on its end a bevel-pinion $o$, which may gear with and be driven by another wheel. (Not shown.) The supply of fish or other material that is to be cooked will be dumped into the funnel-mouth $k$, while the feed-screw $m$ is constantly revolving. This screw will have a rapidity of revolution timed with due regard to the speed of revolution of the screw $j$ in the steam-cylinder A. The screw $m$ will force the material and have the effect to keep the feed-neck L constantly choked or jammed full of material moving into the cylinder, and thereby will prevent the escape of steam under pressure from the cylinder.

The case P of the compressor is tapered, and in the present instance its large end is joined to the plate D, which serves as a head for the steam-cylinder. This plate has on one side a circular flange $q$ for the end of the steam-cylinder A, and lower down and on the reverse side is another circular flange $r$ for the end of the compressor-case P. The elliptic-shaped discharge-opening $e$ is at the center. Thus the cooked material will pass through the head D and from the lower part of the steam-cylinder into the upper part of the compressor-case.

A tapered compressing-screw $s$ is on a pipe or hollow shaft $t$ within the case. This hollow shaft has holes $u$ along its length. The shaft at one end turns in a hole $v$ in the head D and at the other end in a bearing $v'$, supported on a bracket $v^2$. Each end of the hollow shaft $t$ is fitted to a stuffing-box $w$ $w'$. A steam-supply pipe $x$ is attached to the first one and an oil-delivery pipe $x'$ to the last one, this latter pipe discharging into an oil and water receiver $y$ immediately below the case P. The oil-receiver has a discharge-opening $y'$. A pulley $z$ is on the end of the hollow shaft $t$. A belt from any source of power may be attached to this pulley. The compressor P is provided with outlets or small holes $p$ to allow oil and water to escape from the interior, such oil and water dripping into the receiver $y$ underneath. It will be observed that the wall or shell of the case for about one-third of its length and adjoining the large end is free of oil-outlets. The object in exempting the large end from holes is to enable the tapered screw to begin to compact or compress the material as it advances into the small diameter of the case.

The operation, in addition to what has already been explained, is as follows: The fish or other material that is to be cooked will ordinarily not quite half fill the cylinder, but will extend along the bottom and will by the action of the screw $f$ be tumbled and kept in motion and forced along and constantly keep the discharge-opening $e$ gorged or choked. This latter condition will, moreover, be promoted by the action and speed of the tapered screw $s$ in the compressor, which will remove the material discharging through the said opening so slowly as to maintain the gorged condition referred to. The steam in the cylinder A will thus be unable to escape at the discharge-opening $e$, and it has been already explained why it cannot escape at the feeding-in end. It will therefore be seen that provision has been made in a continuous apparatus for cooking the material by the direct application to the material of steam under pressure. This affords important advantages. It enables the maintenance of a much higher temperature. The pressure of the steam insures a penetration of the entire mass of material and a much more rapid cooking process. Besides the product turned into the compressor P is in condition to more freely yield its oil.

The apparatus thus combines a cooker to cook the fish and a compressor to compress the cooked fish and extract the oil and water therefrom in a continuous operation. There is no handling of the fish in transferring same from the cooking-cylinder to the press and no intermission in charging the cooking apparatus or in discharging the cooked and pressed dry fish product.

In the compressor steam is entered by the supply-pipe $x$ into the hollow shaft $t$, and as the tapered screw $s$ drives the mass forward into the tapered case the oil and water will flow out of the holes or outlets $p$ in the case and also flow through the holes $u$ into the revolving hollow shaft $t$, and thence by the pipe $x'$ to the receiver $y$. The steam from pipe $x$, entering the hollow shaft $t$, is not under any appreciable pressure, but serves merely to blow or wash the oil and water through the said shaft. The cooked material, freed of its oil and water and in comparatively dry condition, will discharge from the small open end $p'$ of the case around the shaft $t$.

A gage T will be employed on the cylinder to denote the steam-pressure and an ordinary blow-off valve U to prevent excessive pressure.

Having thus described my invention, what I claim is—

1. In a cooking apparatus the combination of a cylinder; a revoluble spiral or screw extending lengthwise within the cylinder; inlets for steam under pressure and opening into the cylinder; a feed-neck opening into the cylinder at one end; a force-feed screw revoluble in said neck which will keep the neck closed to the escape of steam; and a discharge-opening at the other end of the cylinder that will be kept closed to the escape of steam by engorgement of the escaping cooked material.

2. In a cooking apparatus the combination of a cylinder; a revoluble spiral or screw extending lengthwise within the cylinder; inlets for steam under pressure and opening into the cylinder; a feed-neck opening into the cylinder at one end; a force-feed screw revoluble in said neck which will keep the neck closed to the escape of steam; a tapered compressor-case having its large end joined to a restricted discharge-opening in the cylinder; and a tapered screw revoluble in said case.

3. In a cooking apparatus the combination of a cooking-cylinder; a revoluble spiral or screw extending lengthwise within the cylinder; inlets for steam under pressure and opening into the cylinder; a feeding-in device at one end of the cylinder which permits continuous feeding of the material to be cooked and at same time prevents back escape of steam; and a discharge-opening at the other end of the cylinder that will be kept closed to the escape of steam by engorgement of the escaping cooked material.

4. The combination of a cooking apparatus having a discharge for the cooked material; a tapered compressor-case having its large end placed to receive the said discharging cooked material and said case having outlets or holes in its wall for the escape of oil and water; a receiver below said case; a pipe through the center of the case and having holes to receive oil and water from the case; and a tapered screw around said pipe, and a pipe connected at one end of the center pipe and leading to the said receiver.

5. In a cooking apparatus the combination of a steam cooking-cylinder; a tapered compressor-case; and a plate, D, having on one side a circular flange, $q$, which fits the end of the steam-cylinder and on the reverse side and lower down another circular flange, $r$, which fits the end of said compressor-case and said plate provided with an opening, $e$, which serves as a discharge from the steam-cylinder into the compressor-case.

6. In a cooking apparatus the combination of a cooking-cylinder; a revoluble spiral or screw extending lengthwise within the cylinder; inlets for steam under pressure and opening into the cylinder; a feeding-in device at one end of the cylinder which permits continuous feeding of the material to be cooked and at same time prevents back escape of steam; a discharge-opening at the other end of the cylinder that will be kept closed to the escape of steam by engorgement of the escaping cooked material; a compressor-case having one end joined to the said discharge-opening of the cooking-cylinder and having outlets for the expressed oil and water and a discharge-opening for the dry cooked product; and a compressing-screw in said case.

In testimony whereof I affix my signature in the presence of two witnesses.

JOSEPHUS F. BUSSELLS.

Witnesses:
CHAPIN A. FERGUSON,
CHAS. B. MANN.